June 25, 1929.  A. R. JONES  1,718,739
SENSITIZED SHEET HOLDER FOR PHOTOGRAPHIC COPYING MACHINES
Filed June 26, 1925  2 Sheets-Sheet 1

INVENTOR
Albert R. Jones
BY
Arthur C. Brown
ATTORNEY

June 25, 1929.　　　　A. R. JONES　　　　1,718,739
SENSITIZED SHEET HOLDER FOR PHOTOGRAPHIC COPYING MACHINES Filed June 26, 1925　　　2 Sheets-Sheet 2

INVENTOR
Albert R. Jones
BY
Arthur C. Brown
ATTORNEY

Patented June 25, 1929.

1,718,739

UNITED STATES PATENT OFFICE.

ALBERT R. JONES, OF KANSAS CITY, MISSOURI, ASSIGNOR TO PHOTOSTAT CORPORATION, OF PROVIDENCE, RHODE ISLAND, A CORPORATION OF RHODE ISLAND.

SENSITIZED-SHEET HOLDER FOR PHOTOGRAPHIC COPYING MACHINES.

Application filed June 26, 1925. Serial No. 39,772.

This invention relates to a photographic copying machine in which a projecting apparatus is used for projecting an image to be photographed onto a sensitized sheet which may be subsequently developed in the usual way. The invention has to do particularly with those copying machines in which the image may be projected on the sheet in such a way that a positive photographic reproduction may be made without the necessity of first making a negative, but in so far as this particular invention is concerned it is immaterial whether the projecting apparatus is constructed so that a negative or positive will result from the exposure. In the present invention a novel form of sheet holder or carrier and operating mechanism therefor is disclosed, so that sheets of sensitized material may be fed into the holder or holders in such a manner that they may be exposed to the projecting apparatus, the arrangement being such that the exposed sheets may be subsequently released by gravity from the holders.

In carrying out my invention a plurality of sheet receiving frames is employed, these being so co-related that when one is reversed the one opposite it will also be reversed, and there is a turntable or rotary support upon which the frames are carried so that after both sides of a sheet have been exposed the frame in which the exposed sheet is contained will be so positioned that upon opening the frame the sheet will drop by gravity into a receptacle provided for it.

Figure 1:
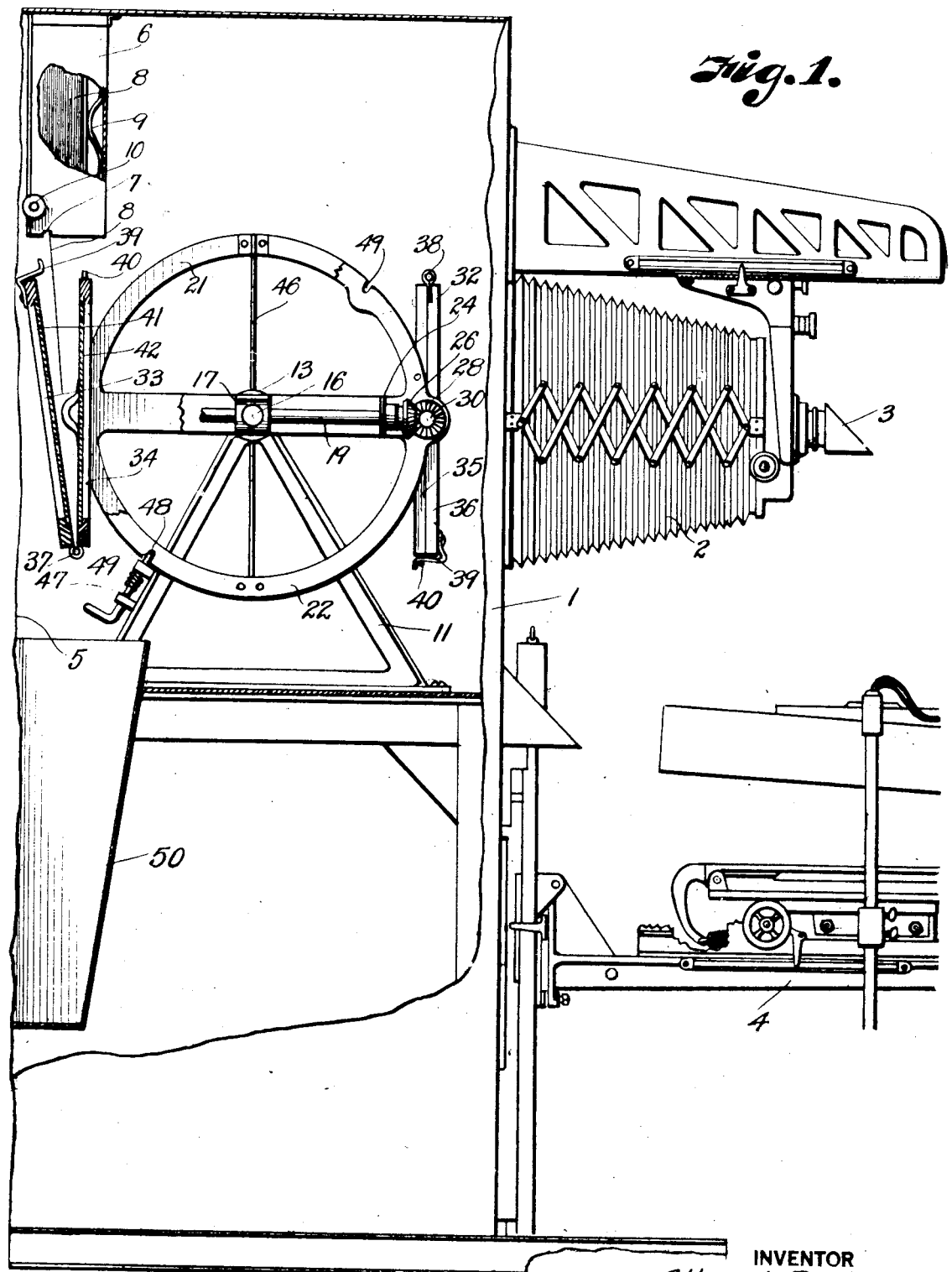

The novelty of my invention will be clearly understood by reference to the following description in connection with the accompanying drawings, in which Fig. 1 is a vertical sectional view through a photographic copying apparatus constructed in accordance with my invention.

Figure 2:
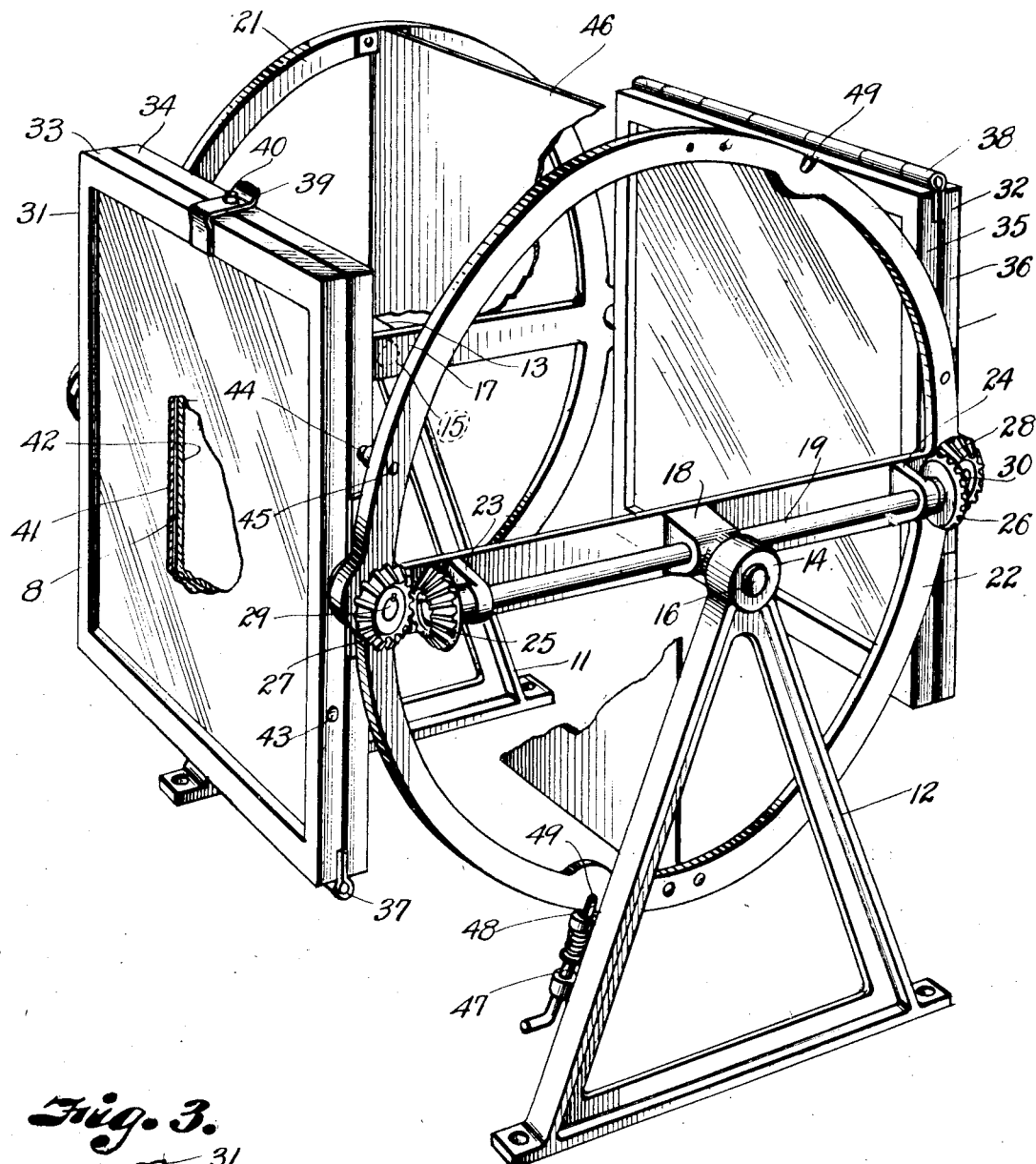
Figure 3:
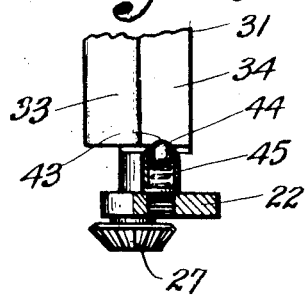

Fig. 2 is an enlarged perspective view of the sensitized-sheet carrying mechanism, and Fig. 3 is a detail view showing a friction detent for holding the frames rigid.

Referring now to the drawings by numerals of reference, 1 designates a casing provided with a projecting apparatus 2 illustrated as a camera with a prism arrangement 3 which will invert the image so that when it is projected upon the sensitized sheet it will be positive rather than negative, as is usual with the ordinary camera. Below the projecting apparatus is a table 4 upon which the objects to be photographed may be positioned.

The mechanism thus far described is not specifically a part of the present invention, this invention residing more particularly in the apparatus inside the casing 1 for presenting the sensitized sheet to the projecting apparatus. It might be illuminative to state here that the casing 1 may be provided with an open rear end 5 communicating with a dark room, or the casing 1 may be large enough to constitute in itself a dark room.

Secured to the upper part of the dark room or casing 1 is a sheet pack or receptacle 6 having a slot 7 in its bottom through which sheets 8 of sensitized material may be fed. The sheets are frictionally held one against the other by a spring follower 9 and they may be fed from the pack by a friction roller 10 in a well understood manner. Within the casing are two standards 11 and 12 having bearings 13 and 14 at their upper ends which receive the stub shafts or trunnions 15 and 16 of the bearings 17 and 18 which carry ring members 21 and 22. On the member 22 is a radial shaft 19. This shaft is supported upon the ring frame member 22 by the bearing brackets 23 and 24 and on the ends of the shaft are mitre gears 25 and 26 which mesh with similar gears 27 and 28 on the trunnions or stub shafts 29 and 30 which support the sensitized-sheet holders or frames 31 and 32. Each sensitized-sheet holder or frame consists of two frame members 33 and 34 for the frame 31, and 35 and 36 for the frame 32. The complementary frame members are hinged together at their edges 37 and 38 so that they open like a book, and they are fastened at their free edges by clasps 39, there being a clasp member 39 on one frame member of each holder which engages a pin 40 on the complementary frame member, as clearly shown in Figure 2. The frame members for the holders 31 and 32 each carry a transparent panel so that the paper sheet 8 may be received between the panels 41 and 42. In each frame member of each sensitized-sheet holder is a depression or notch 43 adapted to be engaged by a spring-pressed detent 44 carried by the bracket 45 on the ring 22, so that the plate or sheet holder may be held in a vertical plane when the sheets 8 are being fed between the panels 41 and 42 and when the exposure is being made As a precautionary measure I provide a light-resisting screen 46 of opaque material between the diametrically oppositely located sheet holders so that light passing through the camera 2 will not penetrate to the back of the casing 1 a distance sufficient to impinge upon the sensitized sheet holder below the receptacle 6.

In order to hold the apparatus rigid while the exposure is being made and while the paper is being fed in between the transparent panels, I provide a spring actuated detent 47 carried by the standard 12 and having a toe 48 to engage in notches 49 in one of the rings.

When the parts are assembled, the operator may open the rear sensitized-sheet holder as shown in Fig. 1, and feed a sheet 8 in between the panels of the sheet holder. The sheet holder may then be closed, the detent 47 withdrawn, and the apparatus turned on the trunnions 15 and 16 until the rear holder takes the position of the front holder 32, shown in Figures 1 and 2. While the holder containing the sensitized sheet is in line with the projecting-apparatus 2, the operator will open the holder which has just been transferred from the front of the casing to the rear so that another sheet may be fed in between the newly presented panels. The rear sheet holder may now be closed. It might be well to state here that the rear sensitized-sheet holder has its hinge at the bottom and its open end at the top to receive the sheet. The front sensitized-sheet holder will have its hinge at the top with the latched end at the bottom, so that throughout the several sequences of operation of the mechanisms, one sensitized-sheet holder will always be positioned so that its hinge will be at the bottom, while the latched end of the other sensitized-sheet holder is at the bottom. There is a special advantage in this as will now become apparent. After the operator has placed or caused the sheet 8 to feed between the panels of the rear sheet holder and has latched the holder, the exposure of the front side of the forward panel may be made, usually by an operator outside the casing 1. Then the operator inside the casing 1 or in the dark room will invert the rear sensitized-sheet holder so that the latched end will be at the bottom and the hinged end will be at the top. While the rear sensitized-sheet holder is being inverted or reversed, a similar motion is being imparted to the front sensitized-sheet holder through the gears 25, 26, 27 and 28, and the shaft 19, so that as the latched end of the rear sensitized-sheet holder is inverted to the bottom, the latched end of the front sensitized-sheet holder will be swung to the top so the hinged portion will be at the bottom. This will cause the second panel of the front holder to be presented to the projecting apparatus so that a second exposure can be made upon the newly presented face of the sheet contained in the front holder.

Two exposures having been made, it now becomes necessary to present a new holder, so the rear holder which has just received its sensitized sheet, will be moved over to the front of the machine. This is accomplished by withdrawing the detent 47 and rotating the carriage consisting of the rings 21 and 22 through an arc of 180 degrees. Bearing in mind that the front sensitized-sheet holder which is now being transferred to the rear has just previously had its latched end uppermost, it will be apparent that by rotating the carriage or rings 21 and 22 through an arc of 180 degrees, the latched end of the holder which has just been moved from front to rear will now be inverted so that it will be at the bottom. If the operator unlatches the lower end of the holder the sheet which has just received the exposure may drop or gravitate into the receptacle 50 provided for it. While the operator is unlatching the rear frame to permit the sensitized sheet to gravitate into the receptacle 50, the operator in front of the machine may make the exposure on the sheet contained in the frame immediately in rear of the projecting apparatus, thus saving time because the exposure can be made concurrently with the release of the already exposed sheet. When this has been accomplished the operator in the dark room or within the casing 1 will swing the rear frame through an arc of 180 degrees so as to present its open end below the slot 7, this also being effective in reversing the front frame so that a second exposure can be made, this time on the opposite side of the sheet in the front frame, while the operator within the casing 1 is feeding the sheet 8 in between the panels of the rear frame.

Therefore it will be apparent that the operation of the machine is almost continuous, the intermittent periods being comparatively slight, and governed only by the length of time required to make the exposure on the sensitized sheets. Therefore, the saving in time during the operating periods of the machine will be an important factor in the cost of production of the photographic prints.

What I claim and desire to secure by Letters Patent is:—

1. In a photographic copying machine, the combination with a camera body embodying a casing and a lens, of a rotatable carrier within the casing, and a pair of independent sheet holders for sensitized material each rotatably mounted on the carrier and adapted to be successively positioned in the focal plane of the camera lens upon rotation of the carrier, a device arranged adjacent to the position of one sheet holder for feeding a sheet into said holder while the other sheet holder is in the focal plane.

2. In a photographic copying machine, the combination with a camera body embodying a casing and a lens, of a rotatable carrier within the casing, a pair of independent sheet holders for sensitized material mounted on the carrier and adapted to be successively positioned in the focal plane of the camera lens upon rotation of the carrier, and a device arranged adjacent to the position of one sheet holder for feeding a sheet into said holder while the other sheet holder is in the focal plane.

3. In a photographic copying machine, the combination with a camera body embodying a casing and a lens, of a rotatable carrier within the casing, and a pair of independent sheet holders for sensitized material each rotatably mounted on the carrier and adapted to be successively positioned in the focal plane of the camera lens upon rotation of the carrier, and gearing connecting the sheet holders through which they are moved in unison in turning relatively to the carrier.

4. In a photographic copying machine, the combination with a camera body embodying a casing and a lens, of a rotatable carrier within the casing, a pair of independent sheet holders for sensitized material pivotally mounted on the carrier and adapted to be successively positioned in the focal plane of the camera lens upon rotation of the carrier, a sheet feeding device arranged adjacent to the position of one sheet holder while the other sheet holder is in the focal plane, and gearing connecting the sheet holders through which they are moved in unison in turning relatively to the carrier.

5. In a photographic copying machine, the combination with a camera body embodying a casing and a lens, of a rotatable carrier within the casing, a print receiving receptacle communicating with the latter, a pair of independent sheet holders for sensitized material mounted on the carrier and adapted to be successively positioned in the focal plane of the camera lens upon rotation of the carrier, and means for causing the discharge of a print from one sheet holder into the print receiving receptacle while the other sheet holder is in operative position in the focal plane of the camera.

6. In a photographic copying machine, a casing, an object-projecting apparatus associated with the casing, and sensitized-sheet holding apparatus within the casing comprising a plurality of reversible, pivoted, sensitized-sheet carrying frames, means for successively presenting the frames to the projecting apparatus, and means for reversing the frames one by the other.

7. In a photographic copying machine, a casing, an object-projecting apparatus associated with the casing, and sensitized-sheet holding apparatus within the casing comprising a plurality of reversible, pivoted, sensitized-sheet carrying frames, means for successively presenting the frames to the projecting apparatus, and means for reversing the frames one by the other, said means comprising reversing gearing between the two frames.

8. In a photographic copying machine, a casing having an object-projecting apparatus associated therewith, and sensitized-sheet holding apparatus comprising a rotatable carrier, a pair of diametrically oppositely located, pivotally supported sheet holding frames on the carrier and operative connections between the frames so that when one is swung on its pivot a like motion will be communicated to the other frame.

9. In a photographic copying machine, a casing having an object-projecting apparatus associated therewith, sensitized sheet-holding apparatus comprising a rotatable carrier, a pair of diametrically oppositely located, pivotally supported sheet holding frames on the carrier and operative connections between the frames so that when one is swung on its pivot a like motion will be communicated to the other frame, and detents for normally holding the pivotal frames rigid with respect to the carrier.

10. In a photographic copying machine, a casing having an object-projecting apparatus associated therewith, sensitized-sheet holding apparatus comprising a rotatable carrier, a pair of diametrically oppositely located, pivotally supported sheet holding frames on the carrier and operative connections between the frames so that when one is swung on its pivot a like motion will be communicated to the other frame, and detents for normally holding the pivotal frames rigid with respect to the carrier, said detents comprising spring-pressed members on the carrier engageable with recesses on the frames.

11. In a photographic copying machine, a casing having an object-projecting apparatus associated therewith, means within the casing for delivering sheets of sensitized material, a rotatable carrier within the casing, sheet supporting holders carried by the carrier, each frame comprising two hinged members adapted to be brought into line with the means for holding the sensitized sheets, means for feeding the sheets between the two members of each frame, means for securing the members together, the carrier being rotated to successively bring the frames in line with the projecting apparatus.

12. A sensitized-sheet holder for photographic copying machines, comprising a rotatable carrier diametrically oppositely located, pivoted sheet holding frames on the carrier, and synchronizing connections between the two frames whereby when one frame is swung, motion will be communicated to the other frame, each frame consisting of two members hinged together, the edges of the members oppositely hinged having fastening means, the synchronizing means being so associated with the two members that the hinge for one frame will at all times be in inverted position with respect to the hinge of the other frame.

In testimony whereof I affix my signature.

ALBERT R. JONES.